United States Patent
Solihin

(10) Patent No.: US 9,229,865 B2
(45) Date of Patent: Jan. 5, 2016

(54) ONE-CACHEABLE MULTI-CORE ARCHITECTURE

(71) Applicant: EMPIRE TECHNOLOGY DEVELOPMENT LLC, Wilmington, DE (US)

(72) Inventor: Yan Solihin, Raleigh, NC (US)

(73) Assignee: Empire Technology Development LLC, Wilmington, DE (US)

(*) Notice: Subject to any disclaimer, the term of this patent is extended or adjusted under 35 U.S.C. 154(b) by 195 days.

(21) Appl. No.: 13/982,620

(22) PCT Filed: Feb. 21, 2013

(86) PCT No.: PCT/US2013/027118
§ 371 (c)(1),
(2) Date: Jul. 30, 2013

(87) PCT Pub. No.: WO2014/130037
PCT Pub. Date: Aug. 28, 2014

(65) Prior Publication Data
US 2014/0237185 A1    Aug. 21, 2014

(51) Int. Cl.
G06F 12/08    (2006.01)
G06F 12/10    (2006.01)

(52) U.S. Cl.
CPC .......... *G06F 12/0811* (2013.01); *G06F 12/084* (2013.01); *G06F 12/0815* (2013.01); *G06F 12/1027* (2013.01)

(58) Field of Classification Search
CPC ................................................... G06F 12/1027
See application file for complete search history.

(56) References Cited

U.S. PATENT DOCUMENTS

| | | | |
|---|---|---|---|
| 6,631,447 B1* | 10/2003 | Morioka et al. | 711/141 |
| 2006/0112227 A1* | 5/2006 | Hady et al. | 711/130 |
| 2007/0239938 A1* | 10/2007 | Pong | 711/122 |
| 2010/0257320 A1* | 10/2010 | Bass et al. | 711/136 |
| 2010/0262973 A1* | 10/2010 | Ernst et al. | 718/104 |
| 2010/0332763 A1* | 12/2010 | Kornegay et al. | 711/130 |
| 2011/0161346 A1* | 6/2011 | Solihin | 707/769 |
| 2011/0320415 A1* | 12/2011 | Berger et al. | 707/692 |
| 2012/0137079 A1* | 5/2012 | Ueda | 711/141 |

OTHER PUBLICATIONS

S. Borkar and A. A. Chien, "The Future of Microprocessors", Communications of the ACM, May 2011, pp. 67-77, vol. 54, No. 5.

(Continued)

*Primary Examiner* — Idriss N Alrobaye
*Assistant Examiner* — Ronald Mood
(74) *Attorney, Agent, or Firm* — Moritt Hock & Hamroff LLP; Steve S. Rubin, Esq.

(57) ABSTRACT

Technologies are generally described for methods, systems, and devices effective to implement one-cacheable multi-core architectures. In one example, a multi-core processor that includes a first and second tile may be configured to implement a one-cacheable architecture. The second tile may be configured to generate a request for a data block. The first tile may be configured to receive the request for the data block, and determine that the requested data block is part of a group of data blocks identified as one-cacheable. The first tile may further determine that the requested data block is stored in a first cache in the first tile. The first tile may send the data block from the first cache in the first tile to the second tile, and invalidate the data blocks of the group of data blocks in the first cache in the first tile.

35 Claims, 7 Drawing Sheets

(56) References Cited

OTHER PUBLICATIONS

Hou, R. et al., "Efficient Data Streaming with On-chip Accelerators: Opportunities and Challenges", Proc. of the International Symposium on High-Performance Computer Architecture, Feb. 2011, 9 pages.

Hackenberg D. et al., "Comparing Cache Architectures and Coherency Protocols on x86-64 Multicore SMP Systems", MICRO'09, Dec. 12-16, 2009, pp. 413-422.

Kelm, J.H. et al., "A Task-centric Memory Model for Scalable Accelerator Architectures", Micro, IEEE, Mar. 2010, 11 pages, vol. 30, Issue: 1.

Kelm, J.H. et al., Cohesion: An Adaptive Hybrid Memory Model for Accelerators, IEEE Computer Society, 2011, p. 42-55.

Li, K, & P. Hudak, "Memory Coherence in Shared Virtual Memory Systems", ACM Transactions on Computer Systems, Nov. 1989, pp. 321-359, vol. 7, No. 4.

Jin, L. et al., "A Flexible Data to L2 Cache Mapping Approach for Future Multicore Processors", MSPC '06, Oct. 2006, 10 pages.

International Search Report and Written Opinion for PCT application with application No. PCT/US2013/027118, dated May 17, 2013, 9 pages.

\* cited by examiner

ONE-CACHEABLE MULTI-CORE ARCHITECTURE

CROSS REFERENCE TO RELATED APPLICATIONS APPLICATION

This application is a U.S. national stage filing under 35 U.S.C. 371 of International Application No. PCT/US2013/027118 filed Feb. 21, 2013. The disclosure of the International Application is hereby incorporated herein by reference in its entirety.

BACKGROUND

Unless otherwise indicated herein, the materials described in this section are not prior art to the claims in this application and are not admitted to be prior art by inclusion in this section.

In multi-core architectures, multiple processor cores may be included in a single integrated circuit die or on multiple integrated circuit dies that are arranged in a single chip package. A cache may be used to store data for access by one or more of the processor cores. Resources in the die may be distributed across two or more tiles. Such resources may include, for example, a directory configured to maintain coherence for the caches, memory controllers, processor cores, caches, etc.

SUMMARY

In some examples, methods for processing a request for a data block in a multi-core processor are generally described. Some methods include receiving the request for the data block at a first tile that includes a first core and a first cache. The request may be received from a second tile that includes a second processor. Some methods include determining, by the first tile, that the data block is part of a group of data blocks. Some methods include determining, by the first tile that one or more data blocks of the group are stored in the first cache in the first tile. Some methods further include sending, by the first tile the data block from the first cache in the first tile to the second tile. Some methods include invalidating, by the first tile, each block in the one or more data blocks of the group of data blocks that are stored in the first cache in the first tile.

In some examples, tiles configured to process a request for a data block in a multi-core processor are generally described. A first tile may include a first cache, a first core, and a controller configured in communication with the first cache. The controller may be configured to receive the request for the data block. The request may be received from a second tile comprising a second cache and a second core. The controller may be configured to determine that the data block is part of a group of data blocks. The controller may be configured to determine that the group is stored in one cache in the processor. The controller may be configured to determine that the group is stored in the first cache in the first tile. The controller may be configured to send the data block from the first cache in the first tile to the second tile. The controller may be configured to invalidate the group of data blocks in the first cache in the first tile.

In some examples, multi-core processors configured to process a request for a data block are generally described. The processors may include a first tile and a second tile configured in communication with the first tile. The first tile may include a first cache and a first controller configured in communication with the first cache. The second tile may be configured to generate the request for the data block, and send the request for the data block to the first tile. The first tile may be configured to receive the request for the data block. The first tile may be configured to determine that the data block is part of a group of data blocks. The first tile may be configured to determine that one or more data blocks of the group are stored in the first cache in the processor. The first tile may be configured to send the data block from the first cache in the first tile to the second tile. The first tile may be configured to invalidate each block in the one or more data blocks of the group of data blocks that are stored in the first cache in the first tile.

In some examples, multi-core processors configured to process a request for a data block are generally described. The multi-core processors may include a first tile in a die, a second tile in the die and a memory. The first tile may include a first cache and a first controller configured in communication with the first cache. The second tile may be configured in communication with the first tile. The memory may be configured in communication with the first and the second tile. The first tile may be configured to generate the request for the data block. The first tile may be configured to determine that the data block is part of a group of data blocks that is stored exclusively in one cache in the multi-core processor. The first tile may be configured to determine that the data block is not stored in the first cache. The first tile may be configured to determine that another block in the group is stored in the first cache. The first tile may be configured to, in response to the determination that the data block is not stored in the first cache and the determination that another block in the group is stored in the first cache, send the request to the memory.

In some examples, multi-core processors configured to process a request for a data block are generally described. The multi-core processors may include a first tile, a second tile and a memory. The first tile may include a first cache and a first controller configured in communication with the first cache. The second tile may be configured in communication with the first tile. The memory may be configured in communication with the first and the second tile. The first tile may be configured to generate a request to initialize a value of the data block. The first tile may be configured to determine that the data block is part of a group of data blocks that is stored exclusively in one cache in the multi-core processor. The first tile may be configured to determine that a block in the group is stored in the first cache. The first tile may be configured to, in response to the determination that a block in the group is stored in the first cache, store the data block in the first cache and initialize the data block to the value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
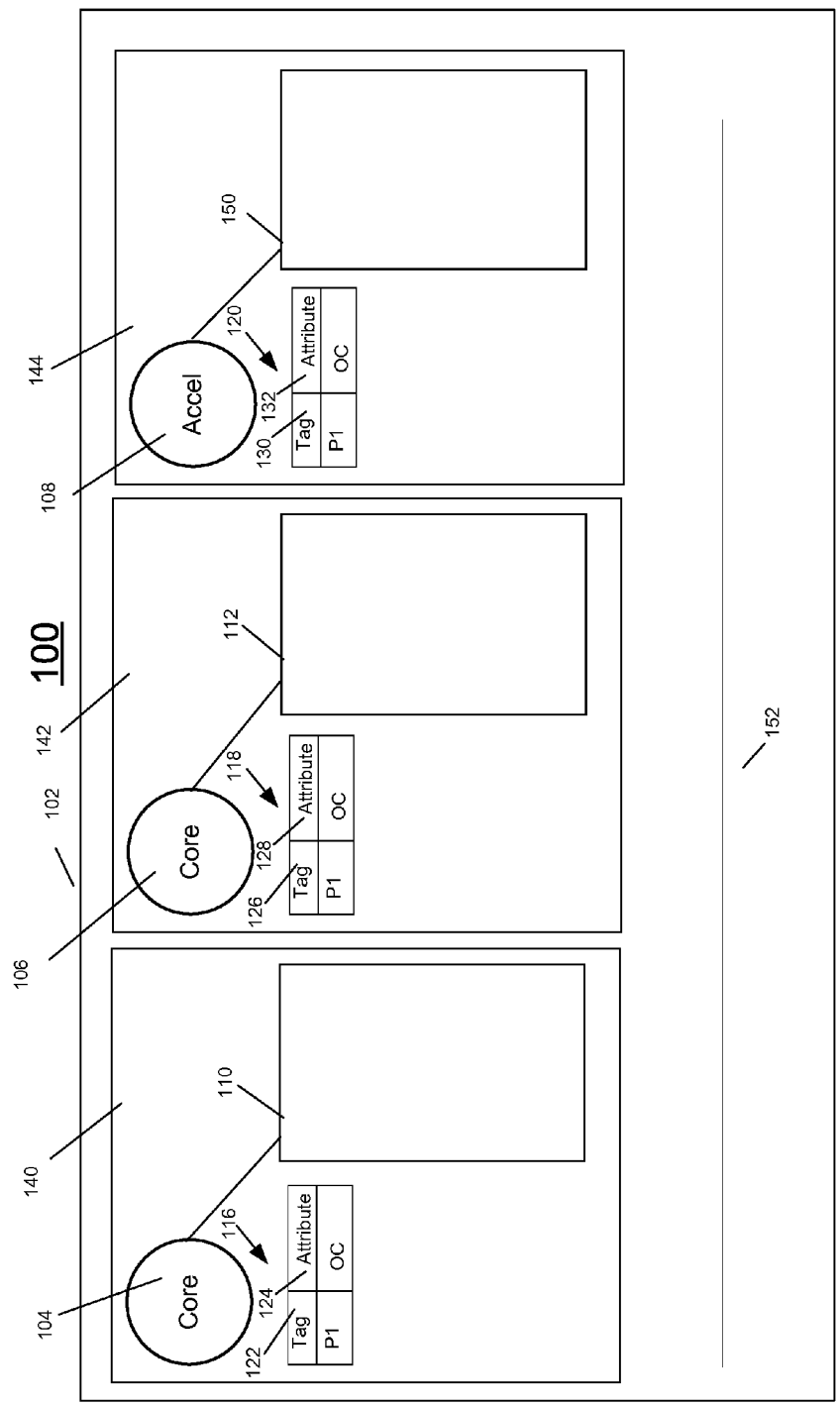
FIG. 1 illustrates an example system that can be utilized to implement a one-cacheable multi-core architecture.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to one-cacheable multi-core architectures.

Briefly stated, technologies are generally described for methods, systems, and devices effective to implement one-cacheable multi-core architectures. In one example, a multi-core processor that includes a first and second tile may be configured to implement a one-cacheable architecture. The second tile may be configured to generate a request for a data block. The first tile may be configured to receive the request for the data block, and determine that the requested data block is part of a group of data blocks identified as one-cacheable. The first tile may further determine that the requested data block is stored in a first cache in the first tile. The first tile may send the data block from the first cache in the first tile to the second tile, and invalidate the data blocks of the group of data blocks in the first cache in the first tile.

As discussed in more detail below, a system may implement a one-cacheable architecture relating to storage of groups of data blocks. An accelerator and a processor core may synchronize and communicate at task boundaries. For example, a processor core may invoke an accelerator for a processing task. The accelerator may access one or more data blocks while executing the task. Coherence for the data blocks may be simplified and may be made more efficient through implementation of a one-cacheable architecture described and explained herein.

FIG. 1 illustrates an example system that can be utilized to implement one-cacheable multi-core architectures arranged in accordance with at least some embodiments described herein. An example system 100 may include a multi-core processor 102 including two or more tiles 140, 142, and/or 144. Tiles 140, 142, 144 may be configured in communication through a bus 152. Tile 140 may include a processor core 104 and/or a cache 110. Tile 142 may similarly include a processor core 106 and/or a cache 112. Tile 144 may include an accelerator or a special purpose core 108 and a buffer 150. Accelerator 108 may be, for example, a processor core configured for a particular operation such as a compression engine, cryptographic engine, XML (extensible markup language) engine, regular expression engine, packet processing engine, graphics processing unit, etc. Tiles 140, 142 and 144 may each be associated with a respective one of translation lookaside buffers 116, 118 and 120. Each of the translation lookaside buffers may be configured to store information that is organized according to fields, such as a tag field and an attribute field. For example, translation lookaside buffer 116 may store information in a tag field 122 and an attribute field 124; translation lookaside buffer 118 may store information in a tag field 126 and an attribute field 128; and translation lookaside buffer 120 may store information in a tag field 130 and an attribute field 132.

The data in tag fields 122, 126, 130 may identify respective groups of data blocks. The data in attribute fields 124, 128, 132 may identify a one-cacheable attribute to indicate that a block from the group of data blocks, identified by the corresponding tag field, may be stored in one tile. In some additional examples, the block may be stored exclusively in one tile. Such an attribute may simplify cache coherence for the corresponding group of data blocks. In still other examples, a coherence region can be defined by a subset of the tiles that form a virtual machine, where the block may be stored exclusively, for the region, in one tile. A one-cacheable attribute may further specify the cache hierarchy level for which the attribute applies, for example whether the one-cacheable attribute applies to the L2 cache, the L3 cache, etc.

Figure 2:
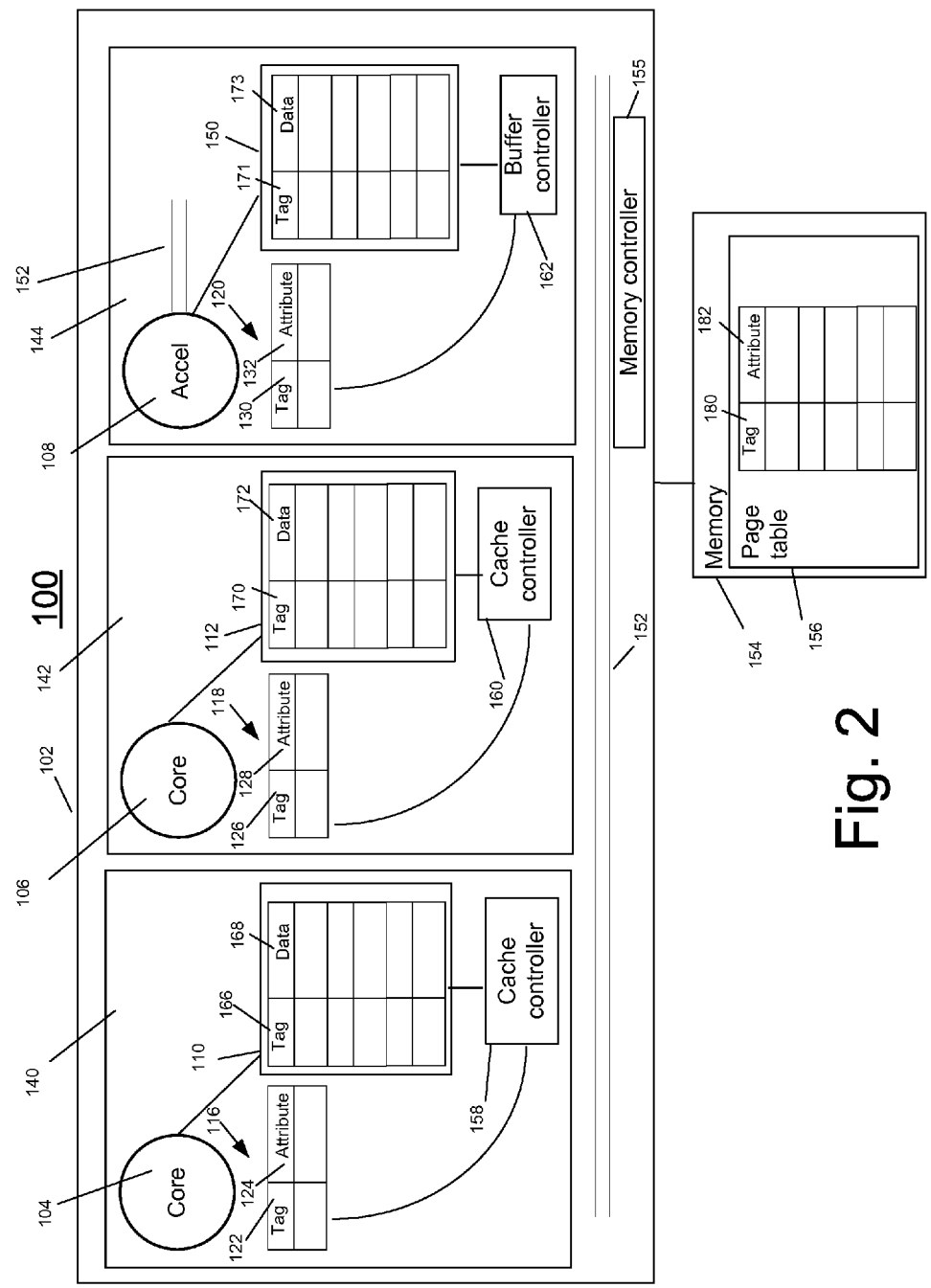
FIG. 2 illustrates an example system that can be utilized to implement a one-cacheable multi-core architecture.

FIG. 2 illustrates an example system that can be utilized to implement one-cacheable multi-core architectures arranged in accordance with at least some embodiments described herein. Those components in FIG. 2 that are labeled identically to components of FIG. 1 will not be described again for the purposes of clarity.

Multi-core processor 102 may be configured to execute instructions. Such instructions may be utilized to control storage and processing of data in multi-core processor 102. For example, instructions may configure multi-core processor 102 to set a value in one or more of attribute fields 124, 128, 132, each corresponding to one of the tag fields 122, 126, 130. A value in the attribute field may indicate how a corresponding group of data blocks, such as a page, may be cached. For example, a value in attribute field 124, 128, 132 may indicate that a page is "cacheable", "non-cacheable" or "one-cacheable". An attribute of "cacheable" may indicate that a block from the group of data blocks may be cached in one or more tiles in multi-core processor 102. An attribute of "non-cacheable" may indicate that a block from the group of data blocks may not be cached in the processor. An attribute of "one-cacheable" may indicate that one or more blocks from the group of data blocks may be stored in one tile in the processor (e.g., exclusive for a defined coherence region, exclusive to all tiles, etc.). A program may declare whether a group of data blocks, or a page, is one-cacheable—such as through use of a programming language construct, a programming language extension, a programming language directive, or an application programming interface. A library, such as a library using an accelerator, may have an entry that, when processed, may cause a determination that a group of data blocks is one-cacheable. In an example, the library may include an entry that identifies blocks in a page as one-cacheable.

Tile 144 with accelerator 108 may include a buffer 150. Accelerator 108 may be configured in communication with one or more cache controllers 158, 160 (described below) through bus or communication link 152. A main memory 154 may be external to and configured in communication with multi-core processor 102. Data stored in main memory 154 may include a page table 156 that includes a tag field 180 and attribute field 182. A memory controller 155 in multi-core processor 102 may facilitate movement of data to and from main memory 154. Values stored in page table 156 may identify a list of pages stored in caches in multi-core processor 102. Page table 156 may also store indications as to how each of the pages may be cached. For example, page table 156 may include fields indicating whether the respective page is cacheable, non-cacheable, or one-cacheable.

Caches 110, 112 may be coupled to a respective one of cache controllers 158, 160; where the cache controllers 158, 160 are operable to control movement of data into and out of caches 110, 112. Accelerator 108 may include a buffer controller 162; where the buffer controller 162 is operable to control movement of data into and out of buffer 150. Cache 110 may be configured to store information in a cache tag field 166 and/or a data field 168. Cache 112 may include a cache tag field 170 and/or a data field 172. Buffer 150 may include information in a buffer tag field 171 and/or a data field 173. In some examples, buffer 150 may not include a buffer tag field 171. In another example, buffer 150 may be a hardware-managed cache, a hardware-managed prefetching buffer, a software-managed buffer, or a software-managed cache. Data fields 168, 172, 173 may be operable to store data for data blocks identified in a corresponding one of cache or buffer tag fields 166, 170, 171.

Figure 3:
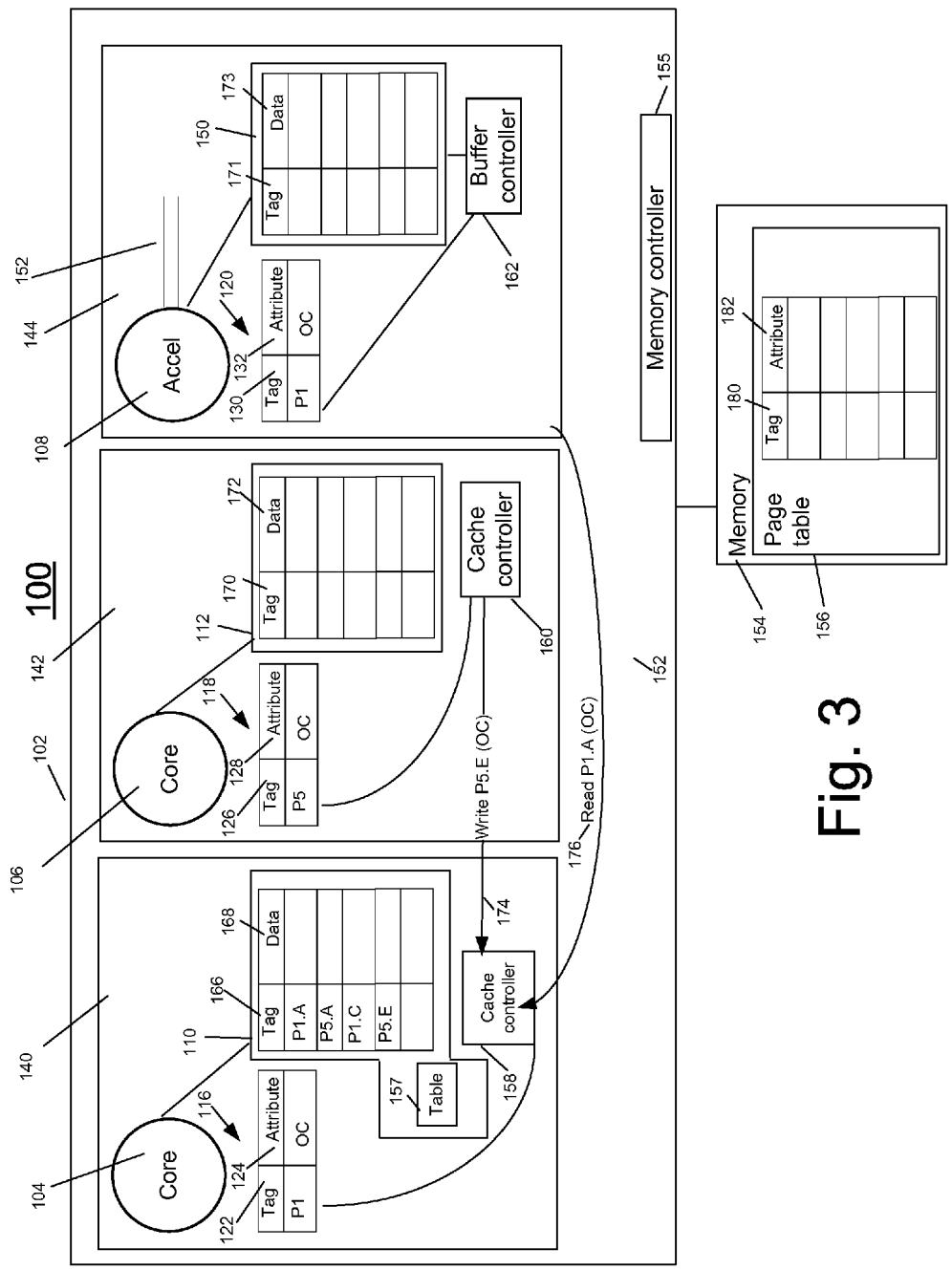
FIG. 3 illustrates an example system that can be utilized to implement a one-cacheable multi-core architecture.

FIG. 3 illustrates an example system that can be utilized to implement one-cacheable multi-core architectures in accordance with at least some embodiments described herein. Those components in FIG. 3 that are labeled identically to components of FIG. 1 or 2 will not be described again for the purposes of clarity.

Multi-core processor 102 may be configured to keep track of whether a block belongs to a group of data blocks (such as a page) that is indicated as one-cacheable. In one example, cache 110 may be utilized to maintain a table 157. Values stored in table 157 may indicate pages that are one-cacheable for which one or more blocks are stored in a respective cache. Table 157 may be indexed using a physical address of a block or a page, and may contain a bitmap that indicates which blocks in a page are currently cached. As blocks from one or more pages can be stored in cache 110, cache controller 158 may update values in table 157 accordingly. As blocks are evicted from cache 110, cache controller 158 may update values in table 157 to reflect the evicted blocks. This example, using table 157, may have relatively greater complexity in implementation, than without table 157. The greater complexity may be because the table should track all one-cacheable pages correctly, the table should be addressable by physical address, and the table should be kept coherent against translation lookaside buffers.

In another example, where table 157 is not included, as cores 104, 106 or accelerator 108 initiate requests (e.g., read or write requests) for data stored in a cache, the requests may include an indication as to whether a page is cached as one-cacheable. A core (such as through a cache controller) or an accelerator (such as through a buffer controller) may initiate a request for data stored in the cache of another core. Such a request may be generated when a core or accelerator imitates a request to read from, or write data to, a particular data block. In response to a request to read from, or write to, at least one data block of a one-cacheable group of data blocks, a cache controller may invalidate other blocks from the group of data blocks that are stored in the corresponding cache.

In the example illustrated in FIG. 3, core 106 may initiate a request to write to data block "E" on group or page 5 ("Write P5.E"). Core 106 may first access translation lookaside buffer 118 to determine whether an indication corresponding to page 5 is stored in tag field 126 of translation lookaside buffer 118. In examples where an indication corresponding to page 5 is stored in translation lookaside buffer 118, core 106 may analyze attribute field 128 to determine how page 5 is cached. In an example, processor 106 may determine that page 5 is cached as one-cacheable.

In examples where an indication corresponding to page 5 is not stored in translation lookaside buffer 118, core 106 may initiate a request to memory 154 requesting the corresponding portion of page table 156 that includes page 5. The corresponding portion of page table 156 may then be sent to core 106 in response to the request to memory 154. Cache controller 160 or a memory management unit may then store the corresponding portion of page table 156 in translation lookaside buffer 118. In the example, an indication of page P5 may be stored in translation lookaside buffer 118 with a one-cacheable attribute ("OC") in attribute field 128.

After analyzing translation lookaside buffer 118 for page 5, and perhaps initiating a request to memory 154, cache controller 160 may then initiate a request 174. In the example, request 174 may be a request to write to block E of page 5. Request 174 may be initiated by cache controller 160 over a bus or other interconnect. Request 174 may also include an indication that page 5 is one-cacheable ("OC"). The indication of one-cacheable ("OC") may provide information to tile 140 that page 5 is one-cacheable so that cache controller 158 may enforce the one-cacheable attribute semantic—discussed in more detail below.

Similarly, in an example, accelerator 108 may initiate a request to read from data block "A" on page 1 ("Read P1.A"). Accelerator 108 may first analyze values in the translation lookaside buffer 120 to determine whether an indication corresponding to page 1 is stored in tag field 130 of translation lookaside buffer 120. In examples where an indication corresponding to page 1 is stored in translation lookaside buffer 120, accelerator 108 may analyze values in the attribute field 132 to determine how page 1 is cached. In examples where an indication corresponding to page 1 is not stored in translation lookaside buffer 120, accelerator 108 may initiate a request to memory 154 for the corresponding portion of page table 156 that includes page 1. The corresponding portion of page table 156 may then be sent to accelerator 108. Buffer controller 162 may then store the corresponding portion of page table 156 in translation lookaside buffer 120. In the example, an indication of page P1 may be stored in translation lookaside buffer 118 with a one-cacheable attribute ("OC").

After analyzing values in the translation lookaside buffer 120 for page 1, buffer controller 162 may then initiate a request 176. In the example, request 176 can be a request to read for block A of page 1. Request 176 may be sent from buffer controller 162 of tile 144 such as over a bus or other interconnect. Request 176 may include a request to read from block A of page 1 along with an indication that page 1 is one-cacheable ("OC"). The indication of one-cacheable ("OC") may provide information to tile 140 that page 1 is one-cacheable so that cache controller 158 may enforce the one-cacheable attribute semantic.

Figure 4:
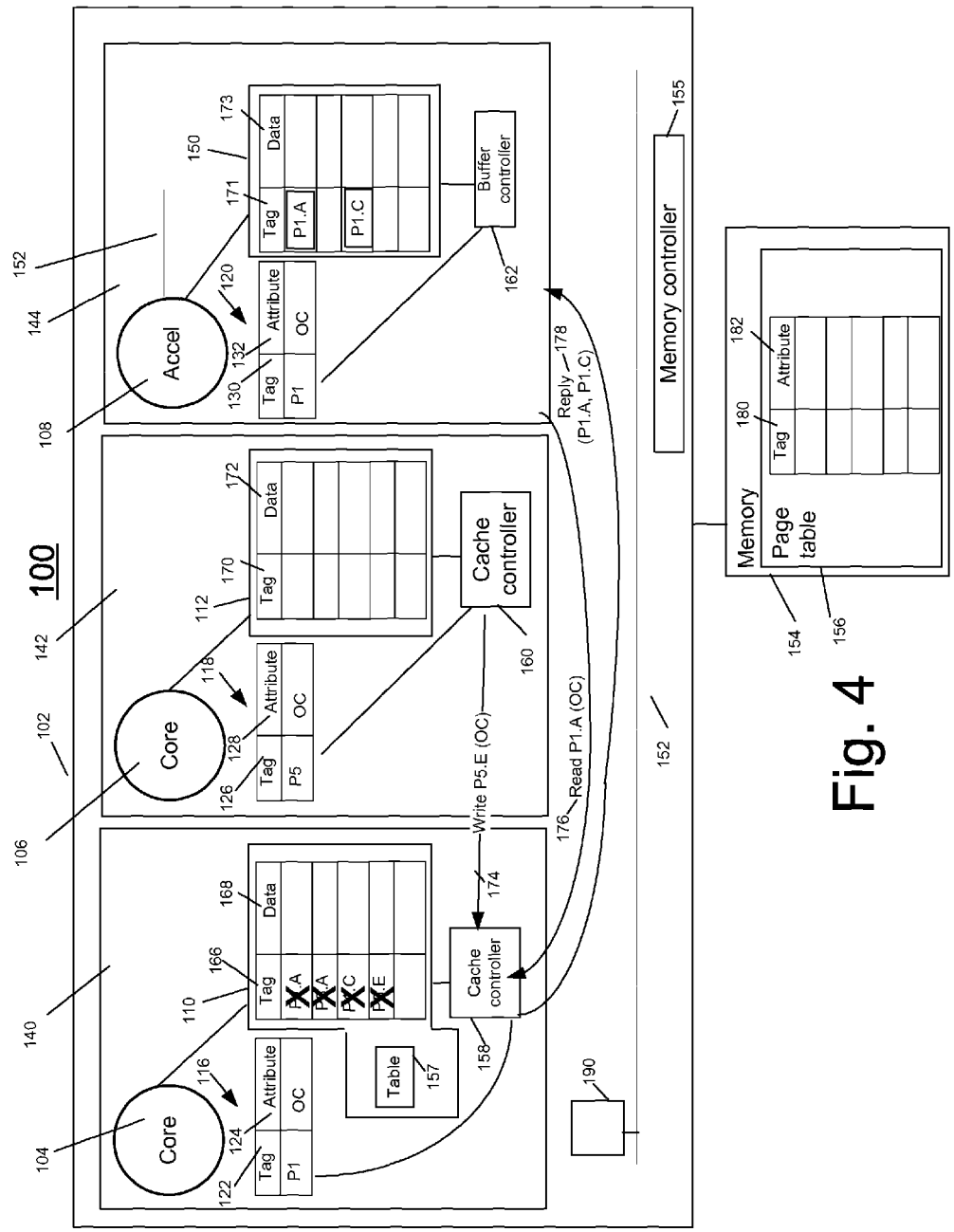
FIG. 4 illustrates an example system that can be utilized to implement a one-cacheable multi-core architecture.

FIG. 4 illustrates an example system that can be utilized to implement one-cacheable multi-core architectures arranged in accordance with at least some embodiments described herein. Those components in FIG. 4 that are labeled identically to components of FIG. 1, 2 or 3 will not be described again for the purposes of clarity.

In the example described above with reference to FIG. 3, cache controller 158 may receive a read request 176 for a data block. In the example, read request 176 can be a request to read block A of page 1. In responding to read request 176, cache controller 158 may identify one or more modified or dirty blocks of data in cache 110 corresponding to page 1. Such modified or dirty blocks of data may have been modified after the blocks were retrieved from memory 154 or shared cache 190. In one example, shared cache 190 may be an L3 or L4 cache. Cache controller 158 may, before responding to read request 176, initiate a write back of the modified or dirty blocks to shared cache 190. For example, if cache 110 corresponds to an L2 cache, cache controller 158 may initiate a write back of the modified blocks to an L3 cache. Shared cache 190 may be shared by multiple tiles in the multi-core processor 102.

In further response to read request 176, cache controller 158 may invalidate one or more entries in cache 110 for blocks corresponding to page 1—as illustrated by the "X". Such invalidation may ensure that blocks identified as belonging to a group of blocks or page that are identified as one-cacheable are stored (e.g., exclusively for a defined coherence region, exclusive to all tiles, etc.) in one cache. Cache controller 158 may then send block A of page 1 through bus or communication link 152. Write requests may be handled in a manner similar to read requests.

In another example, prior to the invalidation, cache controller 158 may send one or more additional blocks stored in cache 110 to tile 144. The additional blocks may correspond to the page identified in read request 176. In the example, read request 176 can request to read block A of page 1. Cache controller 158 may send a reply message 178 including additional blocks of page 1 that are stored in cache 110. In the example, block A and C of page 1 are stored in cache 110. Therefore, blocks A and C of page 1 may be sent in reply message 178 to tile 144. Buffer controller 162 of tile 144 may receive blocks A and C in reply message 178 and store blocks A and C in buffer 150. Buffer controller 162 may fetch additional blocks in page 1 not supplied in reply message 178 from memory 154.

In some examples, cache controller 158 may be configured to invalidate blocks in response to read or write requests but not send reply message 178. Invalidation alone, without reply message 178 may be beneficial in circumstances where cache 110 is not the lowest level cache—such as when a shared cache 190 is used. In this example, where cache 110 is not the lowest level cache, data blocks invalidated from cache 110 may still be fetched from shared cache 190 at a lower level latency than if cache controller 158 were to fetch the data from memory 154. In examples where a requesting core is physically far away, such as may be the case with an accelerator, utilizing reply message 178 may be beneficial because data blocks of a page can be transferred to a requesting core or accelerator proactively. Such transfer of data blocks may result in fast and energy efficient operation of the multi-core processor 102.

In an example, accelerator 108 may make a request to access a data block P1.B. The access request may result in a miss in buffer 150. Translation lookaside buffer 120 may indicate that page P1 is a one-cacheable page. Buffer controller 162 may determine that at least one block in page P1 (P1.A or P1.C) is currently stored in buffer 150. Due to the property of one-cacheable page, buffer controller 162 can infer that none of page P1's blocks are stored in other caches. Thus, buffer controller 162 can issue a non-coherent memory fetch directly to memory controller 155. The memory fetch request may not be broadcasted on bus 152 in a snoopy coherence protocol, and may not inquire a directory in a directory-based coherence protocol. Instead, the memory fetch request may be directly sent to the memory controller, bypassing coherence protocols.

In an example, accelerator 108 may make a request to access and initialize a data block P1.D with a zero value. The access request may result in a miss in buffer 150. Translation lookaside buffer 120 may indicate that page P1 is a one-cacheable page. Buffer controller 162 may determine that at least one block in page P1 (P1.A or P1.C) is currently stored in buffer 150. Due to the property of one-cacheable page, buffer controller 162 can infer that none of page P1's blocks are stored in other caches. Thus, buffer controller 162 can install a block initialized to zero value directly in the buffer 150. The block installation may not be broadcasted on bus 152 in a snoopy coherence protocol, and may not inquire a directory in a directory-based coherence protocol. The block installation bypasses the coherence protocol.

Among other possible benefits, a system configured in accordance with the present disclosure may be able to simplify cache coherence. In examples where a group of data blocks or a page is indicated as being one-cacheable, the system may know that once a first block is found, no other tiles will cache (e.g., no other tiles within the coherence region) blocks in the page. Thus, once a first block of a page is found, processors need not look in other caches. Consequently, blocks may be transferred in bulk. Once a first block of a one-cacheable page is transferred, other blocks in the page should also be transferred without requiring a specific request to transfer the other blocks.

Coherence mechanisms can take advantage of a communication pattern between accelerators and cores. Accelerators may access relatively large blocks of data sequentially. For example, a processor core may process a large block of data, followed by the accelerator processing the large block of data. Using one of the disclosed systems, the accelerator may obtain data from an input stream from one cache used by a thread where the thread dispatched a task. The accelerator need not probe other caches. By obtaining data from one cache, the accelerator or processor core may reduce the number of cache miss requests and number of coherence messages, thereby reducing data transfer latency, and improving performance and energy efficiency.

A one-cacheable attribute may provide for a level of coherence at a granularity level that may be particularly useful for use in multi-core processors that include an accelerator or a special purpose core. Validation messages may be sent at task boundaries resulting in less communication traffic. Synchronization and communication between an accelerator and a core may be realized. Bulk transfer of data stored in a cache may be realized because a request for one block may result in other related blocks being transferred. Bus broadcasting may be avoided. If a private cache has one block belonging to a group of blocks or a page identified as one-cacheable, no blocks from such a group would be available in other private caches (e.g. other private caches within a defined coherence region). In response to a miss for a block of the one-cacheable page, non-coherent requests for the block may be made to a shared cache or the main memory. By limiting broadcast to other caches and directing requests to a shared cache or main memory, lower latency and lower power consumption may be realized.

In libraries where blocks are zeroed out, when there is a cache miss in a one-cacheable page where at least one block is found in the cache, the cache controller may avoid fetching further blocks. Any cache misses to other blocks in the group can be serviced by installing blocks initialized to a zero value. By directly installing zero valued blocks in the cache, lower latency, lower bandwidth consumption from coherence traffic, and lower power consumption may be realized.

Figure 5:
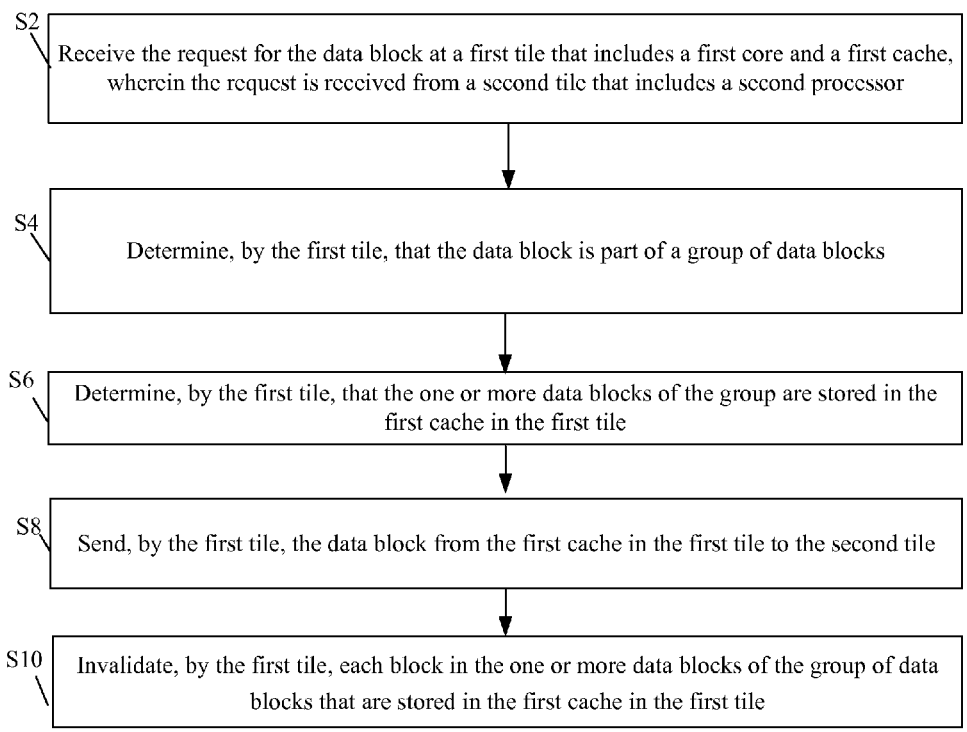
FIG. 5 depicts a flow diagram for an example process for implementing a one-cacheable multi-core architecture.

FIG. 5 depicts a flow diagram for an example process for implementing one-cacheable multi-core architectures arranged in accordance with at least some embodiments described herein. In some examples, the process in FIG. 5 could be implemented using system 100 discussed above to process a request for a data block in a multi-core processor.

An example process may include one or more operations, actions, or functions as illustrated by one or more of blocks S2, S4, S6, S8 and/or S10. Although illustrated as discrete blocks, various blocks may be divided into additional blocks, combined into fewer blocks, or eliminated, depending on the desired implementation.

Processing may begin at block S2, "Receive the request for the data block at a first tile that includes a first core and a first cache, wherein the request is received from a second tile that includes a second processor." At block S2, a first tile may receive a request for a data block. The first tile may include a first core and a first cache. The request may be received from a second tile that includes a second core. The request may include an indication that blocks in the group are stored in one cache in the processor. The request may be a read, write, or pre-fetch request.

Processing may continue from block S2 to block S4, "Determine, by the first tile, that the data block is part of a group of data blocks." At block S4, the first tile may determine that the data block is part of a group of data blocks.

Processing may also continue from block S4 to block S6, "Determine, by the first tile, that the one or more data blocks of the group are stored in the first cache in the first cache in the first tile." At block S6, the first tile may determine that the group of data blocks is stored in one cache in the first tile and that the group of data blocks is stored in the first cache in the first tile.

Processing may continue from block S6 to block S8, "Send, by the first tile, the data block from the first cache in the first tile to the second tile." At block S8, the first tile may send the data block from the first cache in the first tile to the second tile. The first tile may further send other data blocks of the group stored in the first cache from the first cache to the second tile.

Processing may continue from block S8 to block S10, "Invalidate, by the first tile, each block in the one or more data blocks of the group of data blocks that are stored in the first cache in the first tile." At block S10, the first tile may invalidate each block (and write the block back if the block is dirty) in the one or more data blocks in the first cache in the first tile. Prior to the invalidation, the first tile may store the data blocks in a shared cache of the multi-core processor. The first tile may store a table that identifies the group and indicates that the group is cacheable in one L2 cache (e.g., exclusively within a defined coherence region).

Figure 6:
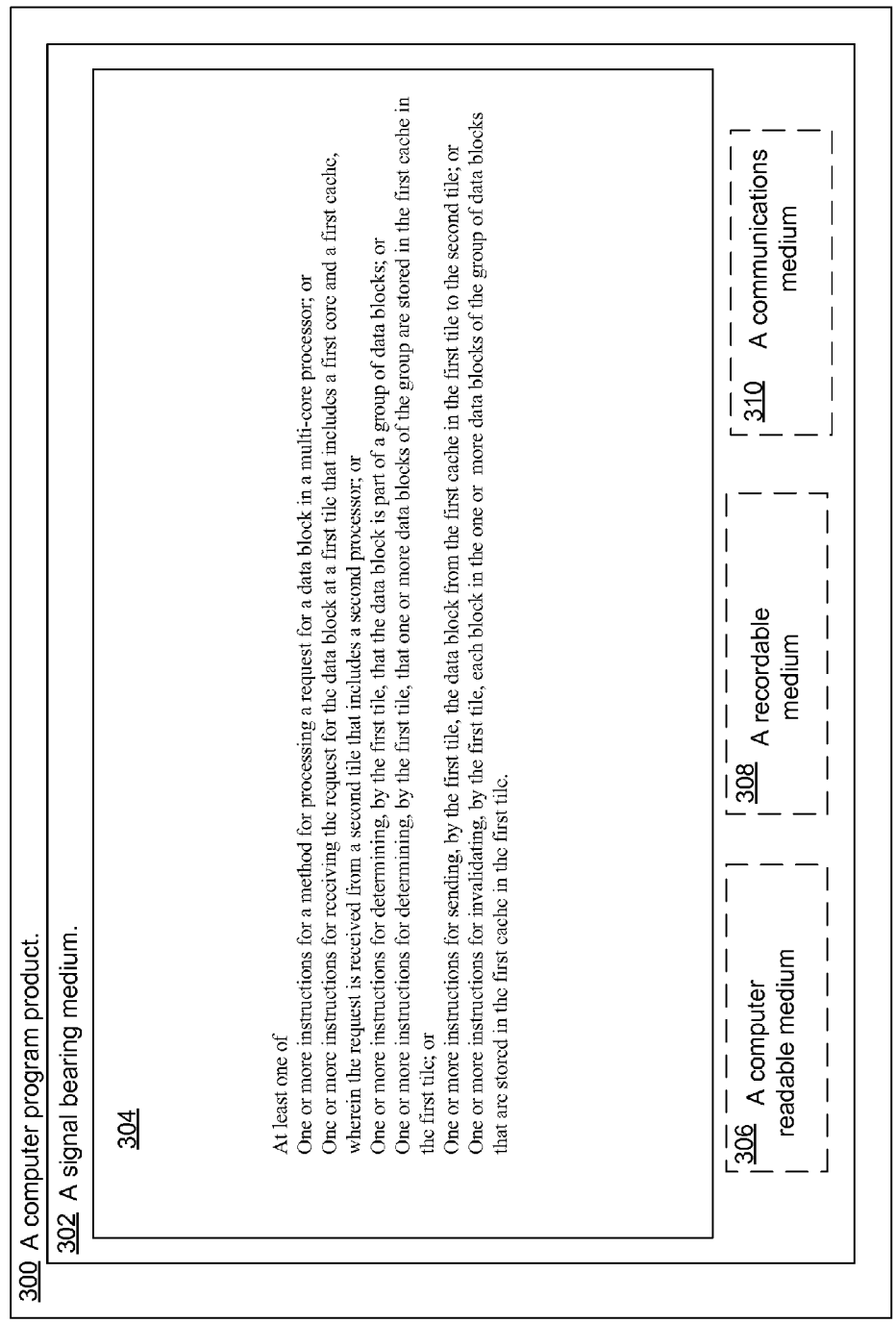
FIG. 6 illustrates a computer program product that can be utilized to implement a one-cacheable multi-core architecture.

FIG. 6 illustrates an example computer program product 300 that can be utilized to implement a one-cacheable multi-core architecture arranged in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-5. Thus, for example, referring to system 100, one or more of core 104, core 106 and/or accelerator 108 in tiles 140, 142, 144 may undertake one or more of the blocks shown in FIG. 6 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 7:
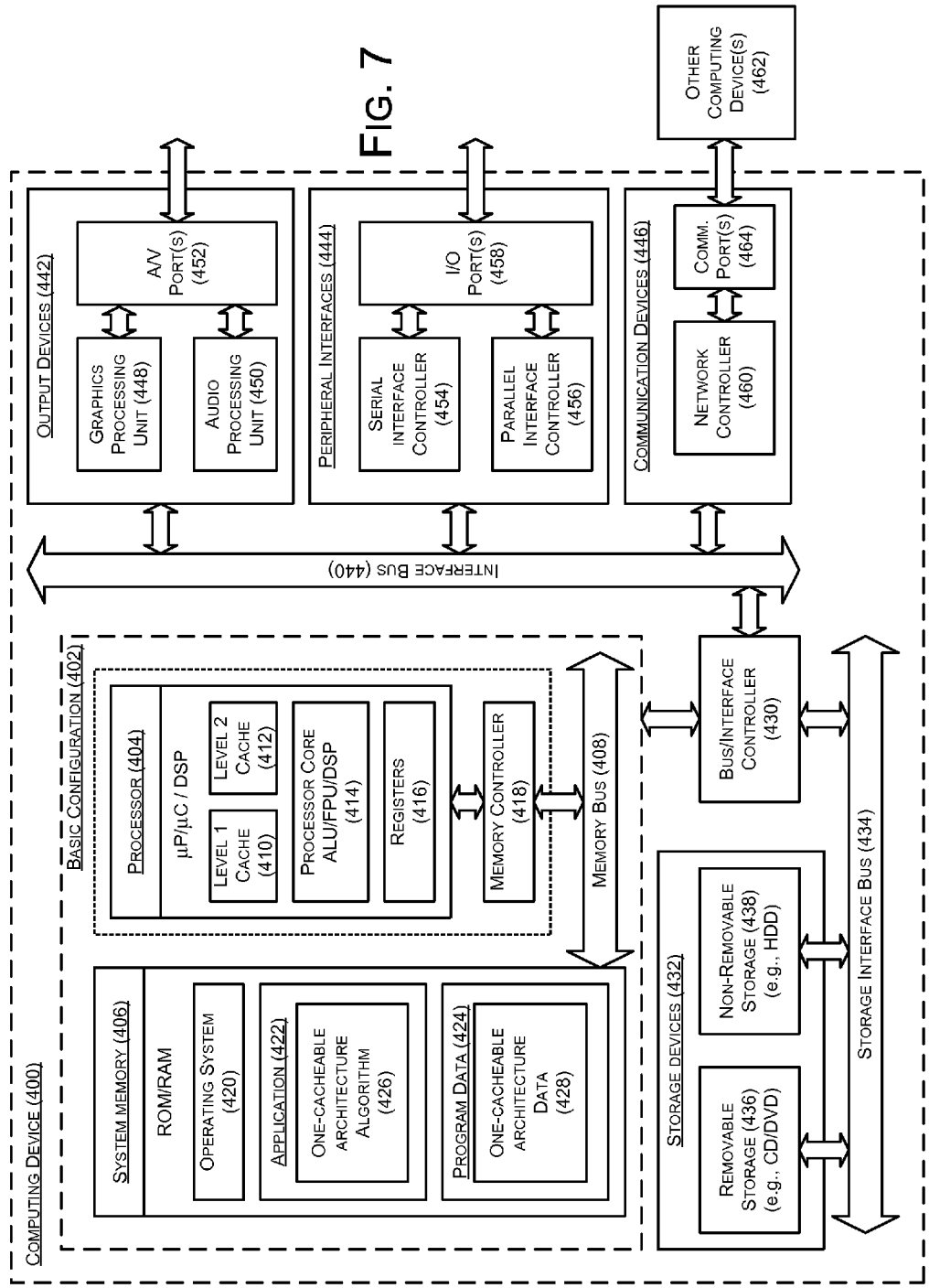
FIG. 7 is a block diagram illustrating an example computing device that is arranged to implement a one-cacheable multi-core architecture, all arranged according to at least some embodiments described herein.

FIG. 7 is a block diagram illustrating an example computing device 400 that is arranged to implement a one-cacheable multi-core architecture arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a one-cacheable architecture algorithm 426 that is arranged to perform the functions as described herein including those described with respect to system 100 of FIGS. 1-6. Program data 424 may include one-cacheable architecture data 428 that may be useful to implement a one-cacheable architecture as is described herein. In some embodiments, application 422 may be arranged to operate with program data 424 on operating system 420 such that a one-cacheable architecture may be provided. This described basic configuration 402 is illustrated in FIG. 7 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to process a request for a data block in a multi-core processor, the method comprising:
   receiving the request for the data block at a first tile that includes a first core and a first cache, wherein the request is received from a second tile that includes a second core;
   determining, by the first tile, that the data block is part of a group of data blocks;
   determining, by the first tile, that one or more data blocks of the group are stored in the first cache in the first tile;
   sending, by the first tile, the data block from the first cache in the first tile to the second tile; and
   in response to sending the data block from the first cache in the first tile to the second tile, invalidating, by the first tile, the data block sent from the first tile to the second tile and each data block in the one or more data blocks of the group of data blocks that are stored in the first cache in the first tile.

2. The method of claim 1, further comprising determining, by the first tile, that the group of data blocks corresponds to a memory page.

3. The method of claim 1, further comprising sending other data blocks of the group stored in the first cache from the first tile to the second tile.

4. The method of claim 1, further comprising sending other data blocks of the group stored in the first cache from the first tile to the second tile without receiving an additional request to send the other data blocks of the group.

5. The method of claim 1, further comprising prior to invalidating, writing back dirty data blocks to a shared cache of the multi-core processor.

6. The method of claim 1, wherein receiving the request for the data block includes receiving the request with an indication that the data block is cacheable exclusively in one cache in the processor.

7. The method of claim 1, wherein receiving the request for the data block includes receiving a request to read the data block.

8. The method of claim 1, wherein receiving the request for the data block includes receiving a request to write the data block.

9. The method of claim 1, wherein receiving the request for the data block includes receiving a request to read or write the data block sent over an interconnect of the multi-core processor.

10. The method of claim 1, further comprising, storing, in the first tile, a table, wherein the table includes an indication of the group and indicates that a data block in the group is cacheable in exclusively one cache in the multi-core processor.

11. A first tile configured to process a request for a data block in a multi-core processor, the first tile comprising:
    a first cache;
    a first core;
    a controller configured in communication with the first cache, wherein the controller is configured to:
       receive the request for the data block, wherein the request is received from a second tile comprising a second cache and a second core,
       determine that the data block is part of a group of data blocks,
       determine that the group is stored in one cache in the multi-core processor,
       determine that the group is stored in the first cache in the first tile,
       send the data block from the first cache in the first tile to the second tile, and
       in response to the data block being sent from the first cache in the first tile to the second tile, invalidate the data block sent from the first tile to the second tile and the group of data blocks in the first cache in the first tile.

12. The first tile of claim 11, wherein the first core and the second core both comprise general purpose processor cores.

13. The first tile of claim 11, wherein the first core comprises a general purpose processor core and the second core comprises a special purpose processor core.

14. The first tile of claim 11, wherein the group of data blocks corresponds to a memory page.

15. The first tile of claim 11, wherein the controller is further configured to send other data blocks of the group stored in the first cache from the first tile to the second tile.

16. The first tile of claim 11, wherein the controller is further configured to send other data blocks of the group stored in the first cache from the first tile to the second tile without receipt of an additional request to send the other data blocks of the group.

17. The first tile of claim 11, wherein the controller is further configured to, prior to the invalidation, write back dirty data blocks to a shared cache of the multi-core processor.

18. The first tile of claim 11, wherein the controller is further configured to receive the request with an indication that the data block is cacheable exclusively in one cache in the multi-core processor.

19. The first tile of claim 11, wherein the controller is further configured to receive a request to read the data block.

20. The first tile of claim 11, wherein the controller is further configured to receive a request to write the data block.

21. A multi-core processor configured to process a request for a data block, the multi-core processor comprising:
a first tile, wherein the first tile includes a first cache and a first controller configured in communication with the first cache; and
a second tile configured in communication with the first tile,
wherein the second tile is configured to:
generate the request for the data block, and
send the request for the data block to the first tile,
wherein the first tile is configured to:
receive the request for the data block,
determine that the data block is part of a group of data blocks,
determine that one or more data blocks of the group are stored in the first cache in the first tile,
send the data block from the first cache in the first tile to the second tile, and
in response to the data block being sent from the first cache in the first tile to the second tile, invalidate the data block sent from the first tile to the second tile and each data block in the one or more data blocks of the group of data blocks that are stored in the first cache in the first tile.

22. The multi-core processor of claim 21, wherein the group of data blocks corresponds to a memory page.

23. The multi-core processor of claim 21, wherein the first tile is further configured to send other data blocks of the group stored in the first cache from the first tile to the second tile.

24. The multi-core processor of claim 21, wherein the first tile is further configured to send other data blocks of the group stored in the first cache from the first tile to the second tile without receipt of an additional request to send the other data blocks of the group.

25. The multi-core processor of claim 21, wherein the first tile is further configured to, prior to the invalidation, store the data block in a shared cache of the multi-core processor.

26. The multi-core processor of claim 21, wherein the first tile is further configured to receive the request with an indication that the data block is cacheable exclusively in one cache in the multi-core processor.

27. The multi-core processor of claim 21, wherein the first controller is further configured to receive a request to read the data block.

28. The multi-core processor of claim 21, wherein the first controller is further configured to receive a request to write the data block.

29. The multi-core processor of claim 21, wherein the second tile includes an accelerator.

30. The multi-core processor of claim 21, wherein the second tile is further configured to, prior to generation of the request:
send a request to a main memory for a section of a page table that corresponds to the data block;
receive the section of the page table from the main memory; and
based on the received section of the page table, determine that the data block is cacheable exclusively in one tile in the multi-core processor.

31. The multi-core processor of claim 21, wherein the second tile is further configured to, prior to generation of the request, analyze a translation lookaside buffer in the second tile and determine that the data block is cacheable exclusively in one cache in the processor.

32. The multi-core processor of claim 21, wherein the second tile is further configured to, prior to generation of the request:
based on a translation lookaside buffer in the second tile, determine that an indication corresponding to the data block is not stored in the translation lookaside buffer;
send a request to a main memory for a section of a page table that corresponds to the data block;
receive the section of the page table from the main memory; and
based on the received section of the page table, determine that the data block is cacheable exclusively in one tile in the multi-core processor.

33. The multi-core processor of claim 21, wherein:
the first tile is further configured to send one or more reply messages to the second tile, wherein the one or more reply messages include other data blocks of the group stored in the first cache; and
the second tile is further configured to:
determine that a particular block is part of the group but not in the reply message, and
send a request to a shared cache for the particular block.

34. A multi-core processor configured to process a request for a data block, the multi-core processor comprising:
a first tile in a die, wherein the first tile includes a first cache and a first controller configured in communication with the first cache;
a second tile in the die and configured in communication with the first tile; and
a memory configured in communication with the first tile and the second tile;
wherein the first tile is configured to:
generate the request for the data block;
determine that the data block is part of a group of data blocks that is stored exclusively in one cache in the multi-core processor;
determine that the data block is not currently stored in the first cache;
determine that another data block in the group is currently stored in the first cache;
in response to the determination that the data block is not stored in the first cache and the determination that the another data block in the group is stored in the first cache, send the request to the memory.

35. A multi-core processor configured to process a request for a first data block, the multi-core processor comprising:
a first tile, wherein the first tile includes a first cache and a first controller configured in communication with the first cache;
a second tile configured in communication with the first tile; and
a memory configured in communication with the first tile and the second tile;
wherein the first tile is configured to:
generate a request to initialize a value of the first data block;
determine that the first data block is part of a group of data blocks that is stored exclusively in one cache in the multi-core processor;
determine that the first data block is not currently stored in the first cache;
determine that a second block in the group is currently stored in the first cache;
in response to the determination that the second block in the group is currently stored in the first cache, store the first data block in the first cache and initialize the first data block to the value.

\* \* \* \* \*